United States Patent [19]

Corrigan et al.

[11] Patent Number: 4,585,918

[45] Date of Patent: Apr. 29, 1986

[54] SYSTEM FOR MEASURING AND STORING DATA RELATING TO THE TIME DURATIONS OF STEPS IN A WELDING OPERATION AS WELL AS WELD CURRENT AND GUN PRESSURE

[75] Inventors: James I. Corrigan, Laurel Springs, N.J.; Casper P. Lunova, Churchville, Pa.

[73] Assignee: The Budd Company, Troy, Mich.

[21] Appl. No.: 470,026

[22] Filed: Feb. 25, 1983

[51] Int. Cl.⁴ .............................................. B23K 11/24
[52] U.S. Cl. ....................................... 219/110; 219/109
[58] Field of Search .............. 219/109, 110, 108, 117.1

[56] References Cited

U.S. PATENT DOCUMENTS 4,317,980   3/1982   Goodrich et al. ................... 219/110

FOREIGN PATENT DOCUMENTS

| 142518 | 7/1980 | German Democratic Rep. | 219/109 |
|---|---|---|---|
| 47-16355 | 2/1971 | Japan | 219/110 |
| 56-14087 | 2/1981 | Japan | 219/110 |
| 56-36390 | 4/1981 | Japan | 219/110 |

Primary Examiner—Clifford C. Shaw
Attorney, Agent, or Firm—Edward M. Farrell; Herman Foster; T. I. Davenport

[57] ABSTRACT

A system is provided to measure, store and display data relating to a series of steps in a plurality of welding operations. The data stored may be printed out to assist in locating steps in an operation which do not conform to predetermined time standards to permit corrective actions to be taken, if necessary.

1 Claim, 5 Drawing Figures

SYSTEM FOR MEASURING AND STORING DATA RELATING TO THE TIME DURATIONS OF STEPS IN A WELDING OPERATION AS WELL AS WELD CURRENT AND GUN PRESSURE

BACKGROUND OF THE INVENTION

Welding control systems have taken numerous different forms. In general, some of these systems have involved measuring and controlling the weld energy applied to a workpiece. When the weld energy used deviates from a predetermined standard, means are employed to automatically correct the system.

In many welding systems, feedback networks are employed in which one or more welding parameters are measured and controlled. These parameters have included measurements and control of current, voltage or resistance. When deviations are detected from predetermined standards, the feedback network changes one or more of the welding parameters to bring them back to the standards being followed. Automatic control and mini-computer systems have also been employed in welding control.

Some welding control systems of the above types are described in U.S. Pat. Nos. 4,343,980; 4,101,753; 3,824,377 and 3,608,285.

In a resistance welding operation, the electrodes of a welding gun are closed to contact the workpiece which may involve two pieces to be welded together, as in a pair of panels in an automobile door, for example. The time taken to move the welding gun into contact with the workpiece is generally called "squeeze time". After the welding gun is in contact with the workpiece, the welding current is applied. The time that the welding current is applied is generally called "weld time". Following the weld current, the welding gun is held in contact with the workpiece for a predetermined time period to assure a good weld. This time is generally called "hold time". After the welding gun is removed from the workpieces, it is idle or off until the next welding operation. The time between welding operations is generally called "off time".

In welding some automotive parts, such as door panels, some operations are more critical than others because failure of the welds during use may cause injury to the driver or occupant of the automobile. In many cases, these critical welds are located at remote areas and not readily adaptable for an automatic welding operation and must be made manually.

Regardless of whether critical welds are made automatically or manually, the durations of the squeeze, weld, hold and off times provide information with respect to whether or not certain standards are being carried out in the welding operations. In addition to the quality of the welds involved, the times involved in performing the steps in a welding operation are important to a manufacturer to assure an efficient welding operation. For example, excessive times may greatly increase the costs involved. In some cases, this may also result in faulty welds. Short time durations less than the predetermined time standards may be indicative of a faulty weld. Thus measurements of times, currents and gun pressure alone may considerably simplify the welding control system involved. Also, the measurements of the times, weld currents and gun pressure may be readily recorded to facilitate corrections and locations of faults in the welding operation.

OBJECTS OF THE INVENTION

It is an object of this invention to provide improved methods and means for monitoring a series of steps in a welding operation.

It is a further object of this invention to provide an improved system for providing permanent records relating to the time durations of all the steps involved in a plurality of welding operations.

It is still a further object of this invention to provide an improved system to permit detection, location and correction of defective steps in a welding operation.

BRIEF SUMMARY OF THE INVENTION

In accordance with the present invention, means are provided to monitor the time durations of a sequential series of steps in a plurality of welding operations, as well as weld currents and gun pressure. Signals representing the time durations are suitably stored and utilized to produce records relating to the time durations of the steps. The records are available to determine the location of steps where the time durations and weld current do not conform to predetermined standards. The records facilitate corrections in the welding operation, if necessary.

Other objects and advantages of the present invention will be apparent and suggest themselves to those skilled in the art, from a reading of the following specification and claims, taken in conjunction with the accompanying drawings.

DETAILED DESCRIPTION OF THE PREFERRED EMBODIMENTS

Figure 1:
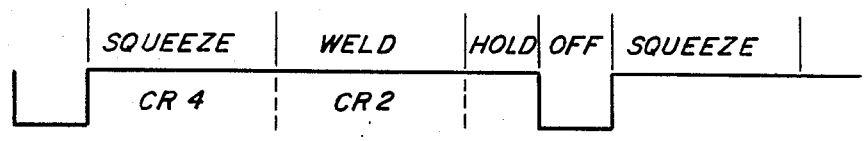
FIG. 1 is a diagram illustrating a series of steps involved in a typical welding operation.

Referring to FIG. 1, various time durations are illustrated. The present invention involves measuring and recording the time durations of the four parameters illustrated. The four parameters illustrated relate to squeeze time, weld time, hold time, and off time. In general, the steps in the operation are sequentially followed out in the manner illustrated. Various circuits, primarily involving relays and the like, to be described, are responsive to the various steps of the squeezing, welding, holding and off operations.

Figure 2:
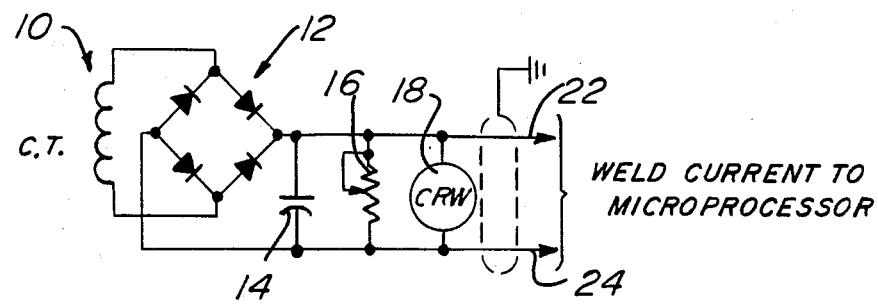
FIG. 2 is a schematic electrical diagram illustrating a typical source of welding current.

Referring to FIG. 2, portions of the power supply for providing the welding current includes a winding 10 of a current transformer. Only a single winding of the transformer is illustrated for developing a voltage which is applied across a full wave bridge rectifier circuit 12. The bridge rectifier circuit 12 develops a DC voltage which is applied across a filter capacitor 14. The output DC voltage is applied to a potentiometer 16. When welding current is being developed, a control relay 18 becomes operative. The voltage across the potentiometer 16 is applied across the workpiece through leads 22 and 24. The welding circuit illustrated in FIG. 2 is conventional.

Except for the details of the present invention, the various details relating to the operation of welding guns and how the resistance type welding operation takes place are conventional. For example, it is well known to those skilled in the art that a welding gun is first moved into position on the workpiece before the welding current is applied. The welding current is then applied for a predetermined time and then discontinued. The welding gun is maintained in place on the workpiece after the welding current has been discontinued to give the weld sufficient time to set. Following the so-called hold time, the welding gun is removed from the workpiece. All of the details of these steps are well known in resistance welding systems. Consequently, the details will not be shown or described except as they relate to the time measurements involved in the present invention.

Figure 3:
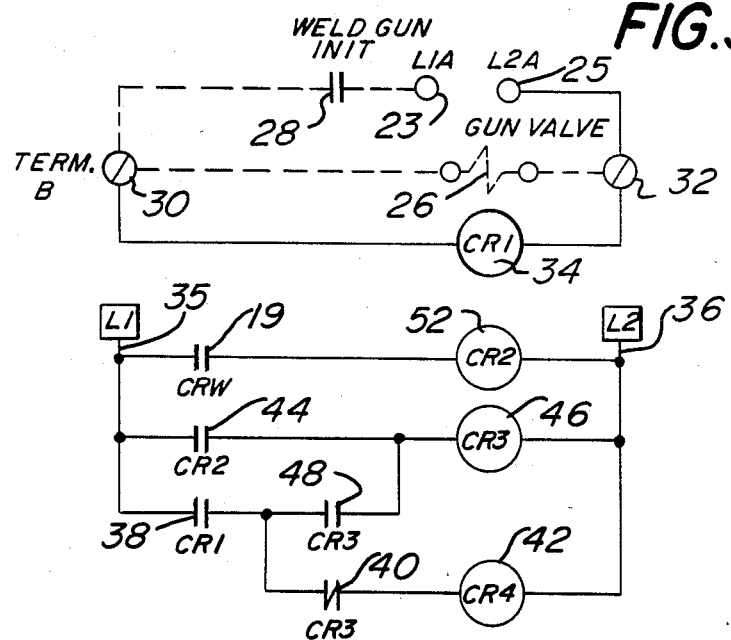
FIG. 3 is a schematic diagram illustrating circuitry responsive to various steps in a welding operation, in accordance with the present invention.

Referring to FIG. 3, power is applied to terminals 23 and 25,. The welding operation takes place when the welding gun is started to be moved into position when an operator pushes a button, for example, to close a pair of contacts 28. Closing of contacts 28 causes current to be applied through terminals 30 and 32 to a valve 26 which becomes operative. When current is applied to terminals 30 and 32, current is applied to a control relay 34, also indicated as CR1.

The bottom portion of the circuit illustrated in FIG. 3 includes a pair of lines 35 and 36 for receiving voltage thereacross. Operation of the control relay 34 causes the contacts 38 to close. Contacts 40 are normally closed. Current from the lines 35 and 36 passes through the contacts 38 and 40 to operate a control relay 42, also indicated as CR4. The operation of the relay 42 causes an output signal to be developed, as will be described in connection with FIG. 4.

Operation of the control relay 42 starts the squeeze time signal. The squeeze time will continue as long as the welding gun is being closed prior to actual contacting of the workpiece involved. After the welding gun has contacted the workpiece, as will be described, the electrical signal caused by the operation of the relay 42 will terminate. The output signal generated is illustrated in FIG. 1 representing the squeeze time involved.

After the welding gun has contacted the workpiece, the welding current is applied to operate the control relay 18 (FIG. 2). Operation of the control relay 18 causes contacts 19 to close (FIG. 3). Current is applied to control relay 52 to start the weld current time, which continues as long as the contacts 19 are closed to operate the relay 52, as illustrated by the signal "weld" in FIG. 1.

When the relay 52 is operated, contacts 44 close to cause the control relay 46 to become operative. Operation of the control relay 46 causes contacts 48 to close and contacts 40 to open. The opening of the relay 40 discontinues the operation of the control relay 42 to indicate the end of the squeeze time and beginning of the weld time.

The weld time signal caused by the operation of the control relay 52 will be discontinued when the control relay 18 (FIG. 2) becomes inoperative as a result of the welding current being discontinued. When the control relay 18 becomes inoperative, contacts 19 open to discontinue the current through the relay 52.

Thus far, there has been described in general terms how the squeeze time and weld time durations have been measured. As illustrated in FIG. 1, the next steps to be measured involve the hold time and off time. In order to adequately describe these steps, reference is made to the more complete diagram of the system illustrated in FIG. 4, which includes circuitry relating to all four time durations to be measured, stored and recorded.

Before continuing with the description of the hold and off time signals, details of the squeeze and weld time operations will be further described.

Basically, the signals represented in FIG. 1 are utilized as enable signals to be applied to counters. During the enabling of the counters, timed pulses produced by timing circuits are applied to selected counters. Counter circuits are known. A typical counter circuit, for example, may store four primary bits with the data in the counter moving up one count for each applied timing pulse. The data will be stored in the counter until strobed by appropriate signals. The selected counters will receive and store the timed pulses only for the duration of the squeeze, weld, hold and off time signals involved.

Figure 4:
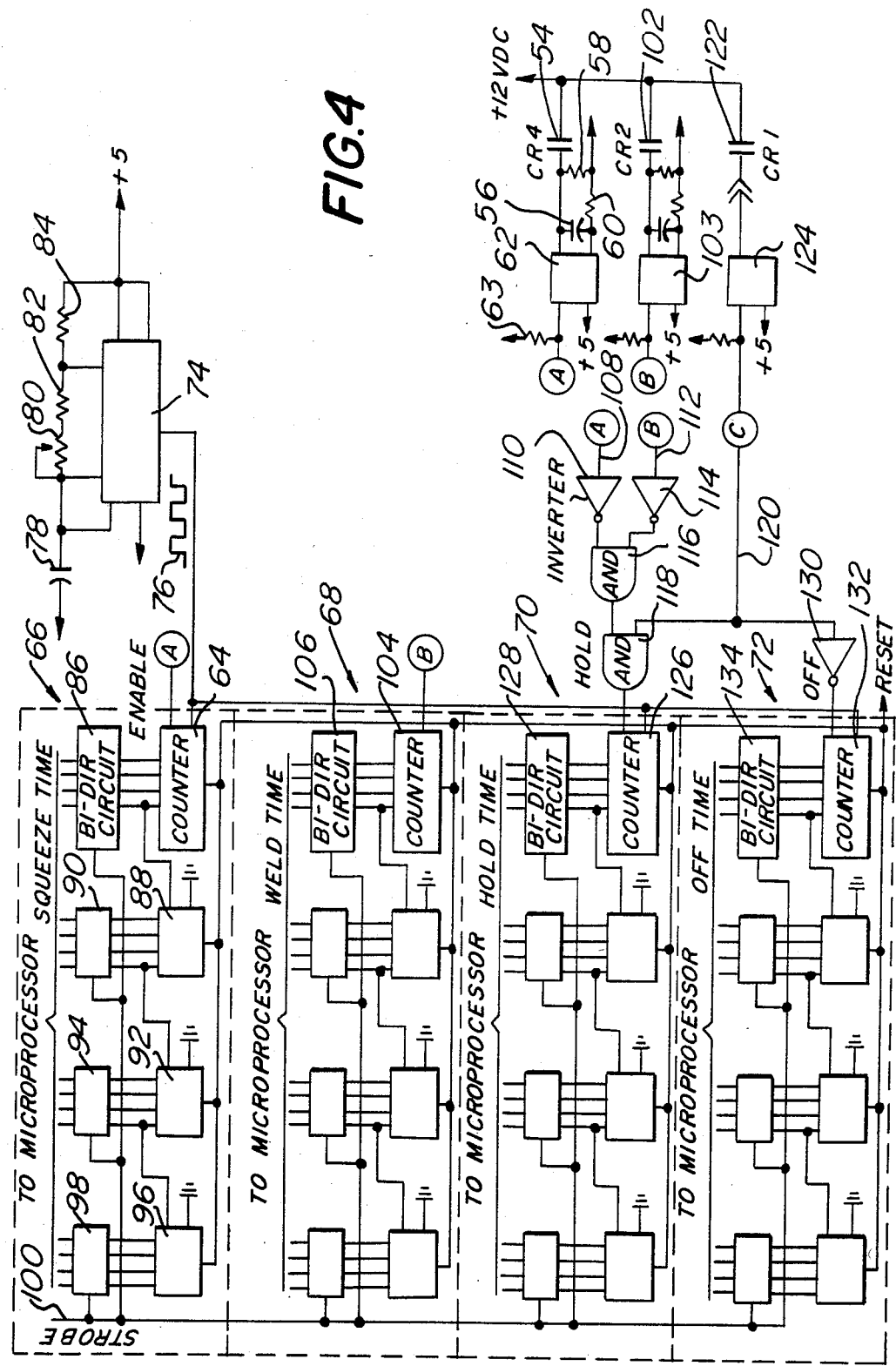
FIG. 4 is a schematic diagram, partly in block diagram form, illustrating details of circuitry for measuring the time durations and storing data relating to the steps in a welding operation, including measuring and monitoring weld gun pressure, in accordance with the present invention.

Referring to FIG. 4, the operation of circuitry involving the squeeze time operation will first be described. At the start of the squeeze time, a pair of contacts 54 are closed as a result of the operation of relay 42 (FIG. 2), to permit a signal of a predetermined level to be applied across circuitry including a capacitor 56, a resistor 58 and a resistor 60. The signal is applied to a buffer or isolator circuit 62. The output signal from the circuit 62 is applied across a resistor 63 to counter 64, of a squeeze time logic circuit 66.

The circuit illustrated in FIG. 4 includes logic circuits 66, 68, 70 and 72 which are designed to measure and store time durations relating to squeeze time, weld time, hold time, and off time, respectively. The logic involved in all four circuits are basically the same and therefore only the logic circuit relating to the circuit 66 will be described in detail, it being understood that the operations of the other circuits 68, 70 and 72 are substantially the same as the circuit 66.

A timer 74 is provided to generate a series of timing pulses 76. The timing circuits may include suitable capacitors such as the capacitor 78 and resistors 80, 82 and 84 to control the time of the pulses generated. Such pulse generators are conventional and well known to those skilled in the art and therefore the complete details relating thereto are not illustrated. The timing pulses 76 from the timer 74 are continuously applied to various counter circuits 66, 68, 70, and 72. However, the timing pulses will become effective only when enable signals are also applied to the counter circuits involved. These enable signals are represented in FIG. 1.

When an enable signal from the buffer or isolator circuit 62 is applied to the counter 64, they are received and stored by the counter. Basically, the counter 64 will store the count of the timer 74 up to a certain level at which point the next adjacent counter 88 will become operative to store the higher number of pulses. In like manner, subsequent counters 92 and 96 are provided to store data relating to the total number of pulses generated during squeeze time. The number of counters employed will be dependent upon the number of pulses to be stored. This is dependent upon the relative times involved in the different operations.

The output circuit including the stored data of counters 64, 88, 92 and 96 are connected to bi-directional circuits 86, 90, 94 and 98, respectively. The bi-directional circuits are normally non-conducting and become conducting when strobe signals are applied thereto from a line 100. When this happens, the stored data in the counters is transferred to appropriate microprocessors.

Upon termination of the squeeze time signal, the squeeze enable signal is discontinued and the pulses applied to the counter 64 will not be stored. The counters 64, 88, 92 and 96 will store the data relating to the total time involved in the squeeze time. At appropriate times, the strobe signal is applied to the line 100 which permits the stored signals to be applied through the bi-directional circuits 86, 90, 94 and 82 to a microprocessor. This data may now be made available in a computer print out, for example, to permit a supervisor to examine the various times involved in the operations being monitored. The information may be used to take corrective measures, if necessary, when the times involved are too long or too short.

The basic circuitry relating to measurement and storage of the weld time duration is substantially the same as the circuitry used for measuring the squeeze time. During the weld time operation, contacts 102, as a result of the operation of the relay 52 (FIG. 3) are closed to apply a signal to a buffer or isolator circuit 103.

The output signal from the buffer 103 acts as an enable signal which is applied to a counter 104. Timing signals 76 from the timing circuit 74 are also applied to the counter 104. During the time that the weld current enable signal is applied to the counter 104, the applied timing signals are stored in the counter. The various other counters and bi-directional circuits within the circuit 68 are similar to that described in connection with logic circuit 66. The total weld time is stored in the various counters. When an appropriate strobe signal is applied to the strobe line 100, the stored data is transferred through the bi-directional circuits to a microprocessor, with the data being available for printout or other use.

The next time duration to be measured involves the hold time. Basically, three conditions must be present to indicate that the welding gun is being held on the workpiece after the welding current has been terminated. The first condition is the absence of a weld current signal. The second condition is the absence of a squeeze signal. The third condition is an indication that the weld gun is in on the workpiece.

The signal from the buffer circuit 62 representing the squeeze time, in addition to being applied to the counter 64, is also applied to a line 108 and inverter circuit 110. The signal from the buffer circuit 103 representing the weld time, in addition to being applied to the AND gate 104, is also applied to a line 112 and an inverter circuit 114. The output signals from the inverter circuits 110 and 114 are inverted and applied to an AND gate circuit 116. When either of the squeeze or weld time signals are applied to the lines 108 and 112, because of the inversion of the signals, no output signal will be generated by the AND gate 116. In the absence of both squeeze and weld time signals, however, an output signal will be generated by the AND gate 116 and applied to another AND gate 118. The AND gate 118 now needs an appropriate signal at the line 120 in order to generate an enable signal to be applied to the circuit 70.

A pair of contacts 122 closes when the welding gun is in position as indicated by the operation of the control relay 34 (FIG. 3). The signal through the contact 122 is applied to a buffer or isolator circuit 124 to the line 120. When the signal level at 120 is high and there is an output signal from the AND gate 116, an output signal will be developed at the AND age 118. An output signal from the AND gate 118 indicates the absence of squeeze and weld current signals and the presence of a signal indicating that the welding gun is on the workpiece.

The output signal from the AND gate 118 is applied to a counter 126 and acts as an enable signal. When the counter 126 is enabled, applied pulses from the timer 74 are stored therein. The various counters in the circuit 70 store the data relating to the total time duration of the hold time. This data may be transferred through bi-stable circuit 128 and the other bi-stable circuit to a suitable microprocessor when a strobe signal is applied to the line 100.

The final time to be measured involves off time. This is the time indicative of the fact that the welding gun is not in place on the workpiece as when there is no high level signal at the line 120. The signal at the line 120, in addition to being applied to the AND gate 118, is also applied to an inverter circuit 130. In the presence of a signal at line 120, no output signal will be developed at the output of the inverter circuit 130. With no signal at the line 120, a high signal is developed by the inverter circuit 130 which provides an enable signal which is applied to a counter 132 of the circuit 72. With an enable signal at the counter 132, pulse signals from the timer 174 are applied to the counter 132 and data relating to the number of pulses are stored therein. The stored data from the counters in circuit 72 are transferred through bi-stable circuit 134 and the other bi-stable circuits illustrated when a strobe signal is applied to the line 100.

The data transmitted from the various counters through the bi-stable circuits in the circuits 66, 68, 70 and 72 may be displayed or otherwise printed out after it has been transferred to various microprocessors. A typical readout of the data involving all the operations described above is as follows:

INVERTED DELTA WELDING
TOOL NO. 723-608-811 STATION #25 R/H
20 DELTA WELDS

| DESIGN SCHEDULE | | ALLOWABLE VARIATION |
|---|---|---|
| PRI. CURRENT | 0628 AMPS | +/−31 AMPS* |
| SQUEEZE TIME | 0020 CYCLES | −2 CYCLES |
| WELD TIME | 0015 CYCLES | +/−0 CYCLES |
| HOLD TIME | 0010 CYCLES | +/−1 CYCLES |
| OFF TIME | 0007 CYCLES | +/−1 CYCLES |
| GUN PRESSURE | 0066 P.S.I. | +/−4 P.S.I. |

ACTUAL READINGS

| WELD | PRIMARY | SQUEEZE | WELD | HOLD | OFF | GUN |

-continued

| NO. | CURRENT | TIME | TIME | TIME | TIME | PRESSURE |
|---|---|---|---|---|---|---|
| #1 | 0637 AMPS | 0019 CY. | 0015 CY. | 0010 CY. | 0008 CY. | 0069 PSI |
| #2 | 0641 AMPS | 0020 CY. | 0015 CY. | 0011 CY. | 0007 CY. | 0067 PSI |
| #3 | 0640 AMPS | 0020 CY. | 0015 CY. | 0010 CY. | 0008 CY. | 0068 PSI |
| #4 | 0631 AMPS | 0020 CY. | 0015 CY. | 0010 CY. | 0007 CY. | 0067 PSI |
| #5 | 0636 AMPS | 0020 CY. | 0015 CY. | 0011 CY. | 0008 CY. | 0066 PSI |
| #6 | 0635 AMPS | 0019 CY. | 0015 CY. | 0010 CY. | 0008 CY. | 0069 PSI |
| #7 | 0631 AMPS | 0020 CY. | 0015 CY. | 0010 CY. | 0008 CY. | 0068 PSI |
| #8 | 0636 AMPS | 0020 CY. | 0015 CY. | 0010 CY. | 0008 CY. | 0069 PSI |
| #9 | 0629 AMPS | 0020 CY. | 0015 CY. | 0010 CY. | 0008 CY. | 0065 PSI |
| #10 | 0626 AMPS | 0020 CY. | 0015 CY. | 0010 CY. | 0008 CY. | 0065 PSI |
| #11 | 0629 AMPS | 0020 CY. | 0015 CY. | 0010 CY. | 0007 CY. | 0066 PSI |
| #12 | 0626 AMPS | 0020 CY. | 0015 CY. | 0011 CY. | 0008 CY. | 0066 PSI |
| #13 | 0631 AMPS | 0020 CY. | 0015 CY. | 0010 CY. | 0008 CY. | 0067 PSI |
| #14 | 0632 AMPS | 0020 CY. | 0015 CY. | 0010 CY. | 0008 CY. | 0066 PSI |
| #15 | 0635 AMPS | 0020 CY. | 0015 CY. | 0011 CY. | 0008 CY. | 0066 PSI |
| #16 | 0639 AMPS | 0020 CY. | 0015 CY. | 0010 CY. | 0008 CY. | 0067 PSI |
| #17 | 0637 AMPS | 0019 CY. | 0015 CY. | 0010 CY. | 0008 CY. | 0068 PSI |
| #18 | 0631 AMPS | 0020 CY. | 0015 CY. | 0010 CY. | 0008 CY. | 0066 PSI |
| #19 | 0629 AMPS | 0020 CY. | 0015 CY. | 0010 CY. | 0007 CY. | 0065 PSI |
| #20 | 0635 AMPS | 0019 CY. | 0015 CY. | 0010 CY. | 0008 CY. | 0069 PSI |

*SHUTDOWN MODE
SECONDARY WELD CURRENT 13,000 AMPS
TIP FORCE 980 LBS.
TIP DRESS SCHEDULE
20 PANELS or 0400 WELDS

When gun valve 26 in FIG. 3 is on, the pressure on the output of the valve 26 in FIG. 3 is monitored and transferred to the microprocessor. This will be displayed or printed out when needed.

In the above readout, there is indicated the type of welds involved, identification of the various stations, the number of welds, and type of steps involved. Data relating to the fixture location and identification number, as well as primary current and welding gun pressure may also be printed out. This data is generated in the welding system by suitable transducers well known to those skilled in the art. Twenty welding operations are illustrated. Design schedules or standards may also be printed out with allowable variations. The columns include the weld number, the primary current and the cycles relating to times involved in squeeze, weld, hold and off times.

The readouts may also include information relating to the welding current and pressure applied the welding gun. In some cases, the tip dressing schedule of the welding gun may be included in the readout. This refers to periodic cleaning of the tips of the welding gun. Some of the items illustrated in the above readout are not directly related to the invention. However, they are illustrated merely to show a typical readout in a welding operation and to illustrate the usefulness of such printed out data. Actually, a program may include a variety of additional items relating to welding operations, if desired.

In examining data involved in a printout, such as the above printout, a supervisor may readily detect the time involved in the various operations. He is then able to quickly detect if the times involved in the various teps are too long or too short and take corrective measures, if necessary. In some cases, slight deviations from the design schedule may be acceptable. In any case, the supervisory personnel has a permanent record of the actual operations involving the particular steps involved for a plurality of workpieces.

Figure 5:
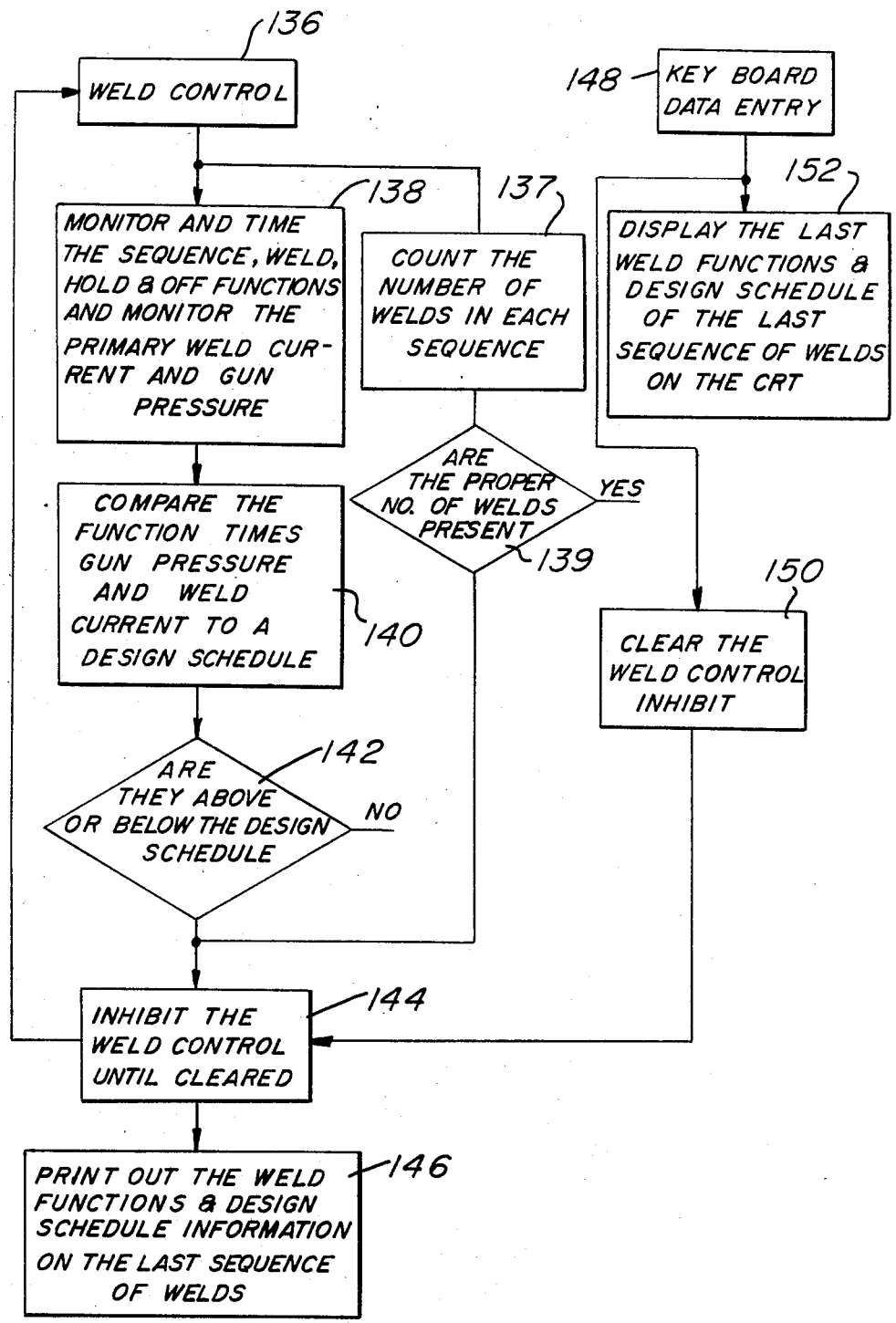
FIG. 5 is a block diagram illustrating steps in a program which may be used in monitoring and recording the electrical signals generated and stored in the circuitry illustrated in FIG. 3, in accordance with the present invention.

Referring to FIG. 5, a typical flow chart for a program which may be used with the present invention is illustrated. A number of steps not directly related to the invention are illustrated because they may be part of the program relating to the welding operations. However, it is understood that the present invention is related to the monitoring and detection of the weld time durations relating to various operating steps in the operation.

Normally, a weld control circuit 136 will become operative to generate a signal when it is desired to monitor the welding operation. The output signals from the weld control circuit 136 is applied to a counter circuit 137 which counts the number of welds involved. The output signals from circuit 137 are applied to comparator 139. If a "yes" signal is developed, the operation continues. A "no" signal is applied to an inhibit circuit 144 which stops the operation.

The output signal from the weld control circuit 136 is also applied to circuitry, represented by a block 138, which monitors the time of the squeeze, weld, hold and off time functions as well as the primary weld current and gun pressure. This circuitry is interconnected with the timing circuit and various data registers described in connection with FIG. 4. Signals representing the different steps in the welding operation are applied from circuitry 138 to a comparator circuit, represented by a block 140, which include comparators for comparing the times involved for the welding steps with predetermined time standards.

Output signals from the comparator circuit 140 are indicative of whether or not the measured times deviate from predetermined standards. If the signals indicate that the measurements fall outside the design schedule, a signal is applied to an inhibit circuit 144. The inhibit circuit 144 develops a signal to prevent further continuance of the operation of the weld control circuit 136. If the various measurements are within the design schedule, the signal from the inhibit circuit 144 wil be applied to circuitry 146 for printing out data relating to the various steps in the welding operation.

When the weld circuit 136 is inhibited, steps must be taken to either correct the fault involved or to override the signal. This will be a decision generally made by supervisory personnel. Supervisory personnel may review the readout and insert into a keyboard 148 a command signal which is applied to a circuit 150 to clear the inhibit signal and to permit normal operation of the system.

The keyboard 148 may also be used to apply a signal to display the last weld function and design schedule of the last sequential welds. This data would be transmitted to circuitry 152. The program illustrated above indicates that it is possible to stop the welding system if desired, when certain design requirements are not complied with. As mentioned, in some cases the supervisor may override the data readout when he feels that the quality of the welds are still acceptable.

The present invention has involved control of a welding operation without complex circuitry. The system described is especially useful in manual operations, although it may also be used in automatic operations. The control of the operation is done by controlling certain preselected time functions. These time functions are generally related to the overall weld quality. Detection and correction is possible without complicated circuitry regarding measurements of weld energy or feedback circuitry.

While the present invention has been described in terms of relays for controlling the operations of contacts, bi-stable circuits may also be employed to produce the enable signals involved. The logic circuitry described may take different forms. For example, the enable signals have been illustrated as high level signals. The polarities and levels of the signals may conceivably be different than those described, with additional inverter circuits being utilized.

What is claimed is:

1. In combination with a welding gun disposed to engage a workpiece and apply welding direct current thereto in a resistance welding system, means for measuring the time durations of a plurality of sequential steps including the time of squeezing said welding gun on said workpiece, welding current time, hold time and idle time in a welding operation comprising:
    (a) first bi-stable circuit means responsive to the starts of said plurality of steps to generate enable electrical signals and for maintaining said enable signals for the duration of the steps being measured;
    (b) second circuit means responsive to the end of said plurality of steps to terminate said enable electrical signals generated by said first bi-stable circuit means;
    (c) a timing circuit for generating pulse signals;
    (d) a plurality of counter circuits responsive to said pulse signals when said enable signals are applied thereto to measure the time durations of said electrical signals;
    (e) a plurality of bi-directional circuits selectively passing data signals stored in said counter circuits representative of said time duration;
    (f) display means;
    (g) said display means comprising means having printed out data relating to the data stored in said counters;
    (h) means for allowing said bi-directional circuits to pass said data signals to said display means;
    (i) means to discontinue said welding operation when any one of said time durations deviate from predetermined time standards;
    (j) said first bi-stable circuit means comprising a plurality of relays for operating a plurality of pairs of contacts;
    (k) said relay circuits and contacts associated with said hold time are utilized with the relays and contacts of said squeeze and weld current time measurements and included in control circuitry for generating the enable signal relating to said hold time, and
    (l) said control circuitry for generating said hold signal being combined with an inverter circuit to generate the enable signal relating to said off time measurement.

* * * * *